United States Patent
Narusawa

(10) Patent No.: US 6,229,519 B1
(45) Date of Patent: May 8, 2001

(54) DISPLAY CONTROLLER FOR COMMUNICATION APPARATUS AND METHOD THEREFOR

(75) Inventor: Hideki Narusawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/105,373

(22) Filed: Jun. 26, 1998

(30) Foreign Application Priority Data

Jun. 27, 1997 (JP) .................................................. 9-172054

(51) Int. Cl.[7] .............................. G09G 5/00; G09G 1/14; G09G 5/24; G06K 9/00; H04M 1/64
(52) U.S. Cl. ............................ 345/127; 345/26; 345/194; 382/181; 379/88.09
(58) Field of Search ................................ 345/26, 27, 516, 345/203, 123, 124, 168, 130, 193, 127, 129, 194, 128, 133, 471, 467, 507; 707/539; 382/181, 190; 379/130, 93, 88.09, 88.1, 88.14, 88.22

(56) References Cited

U.S. PATENT DOCUMENTS

| | | | |
|---|---|---|---|
| 3,617,722 | * | 11/1971 | Grosky ..................................... 345/26 |
| 3,895,374 | * | 7/1975 | Williams ................................ 345/141 |
| 4,682,161 | * | 7/1987 | Bugg ..................................... 345/471 |
| 4,855,949 | * | 8/1989 | Garland ................................. 345/141 |
| 5,107,259 | * | 4/1992 | Weitzen et al. ....................... 345/471 |
| 5,212,477 | * | 5/1993 | Indekeu et al. ....................... 345/127 |
| 5,297,247 | * | 3/1994 | Kan ....................................... 345/193 |
| 5,724,065 | * | 3/1998 | Chang et al. ......................... 345/115 |
| 5,936,545 | * | 8/1999 | Tsumura ................................ 345/468 |

* cited by examiner

*Primary Examiner*—Matthew Luu
*Assistant Examiner*—Chante' Harrison
(74) *Attorney, Agent, or Firm*—Scully, Scott, Murphy & Presser

(57) ABSTRACT

A radio selective calling receiver having means for receiving a message, and displaying the received message on a display section, the receiver comprising storage means 9 in which the maximum number of alphanumeric, katakana or Kanji which can be displayed on one screen of the display section in the double-width size can be stored; determination means 10 for, when a message is received, determining whether or not the number of characters in the received message is larger than the maximum number of characters stored in the storage means which can be displayed on one screen in the double-width size; determination means 11 for determining whether or not the received message contains alphanumeric or katakana characters when the determination means 10 determines that the number of characters in the received message is larger; and control means for converting alphanumeric or katakana characters in the message into the singe-width size when the determination means 11 determines that the received message contains alphanumeric or katakana characters, and displaying the alphanumeric or katakana characters on the display section in the single-width size.

18 Claims, 5 Drawing Sheets

Fig.3

| b8 | b7 | b6 | b5 | | | | | | 0 0 0 0 1 1 1 1 |
|---|---|---|---|---|---|---|---|---|---|

| b8 | b7 | b6 | b5 | b4 | b3 | b2 | b1 | 行\列 | 0 | 1 | 2 | 3 | 4 | 5 | 6 | 7 |
|---|---|---|---|---|---|---|---|---|---|---|---|---|---|---|---|---|
| | | | | 0 | 0 | 0 | 0 | 0 | ─ | ⊥ | | 一 | タ | ミ | = | × |
| | | | | 0 | 0 | 0 | 1 | 1 | ■ | ┬ | 。 | ア | チ | ム | ╀ | 円 |
| | | | | 0 | 0 | 1 | 0 | 2 | ■ | ┤ | 「 | イ | ツ | メ | ╂ | 年 |
| | | | | 0 | 0 | 1 | 1 | 3 | ■ | ├ | 」 | ウ | テ | モ | ╀ | 月 |
| | | | | 0 | 1 | 0 | 0 | 4 | ■ | ─ | 、 | エ | ト | ヤ | ◢ | 日 |
| | | | | 0 | 1 | 0 | 1 | 5 | ■ | ─ | ・ | オ | ナ | ユ | ◣ | 時 |
| | | | | 0 | 1 | 1 | 0 | 6 | ■ | │ | ヲ | カ | ニ | ヨ | ◤ | 分 |
| | | | | 0 | 1 | 1 | 1 | 7 | ■ | │ | ァ | キ | ヌ | ラ | ◥ | 秒 |
| | | | | 1 | 0 | 0 | 0 | 8 | │ | ┌ | ィ | ク | ネ | リ | ♠ | |
| | | | | 1 | 0 | 0 | 1 | 9 | ▌ | ┐ | ゥ | ケ | ノ | ル | ♥ | |
| | | | | 1 | 0 | 1 | 0 | A | ▌ | └ | ェ | コ | ハ | レ | ♦ | |
| | | | | 1 | 0 | 1 | 1 | B | ▌ | ┘ | ォ | サ | ヒ | ロ | ♣ | |
| | | | | 1 | 1 | 0 | 0 | C | ■ | ╭ | ャ | シ | フ | ワ | ● | |
| | | | | 1 | 1 | 0 | 1 | D | ■ | ╲ | ュ | ス | ヘ | ン | ○ | |
| | | | | 1 | 1 | 1 | 0 | E | ■ | ╱ | ョ | セ | ホ | " | / | |
| | | | | 1 | 1 | 1 | 1 | F | ＋ | ╱ | ッ | ソ | マ | " | ＼ | |

DISPLAY CONTROLLER FOR COMMUNICATION APPARATUS AND METHOD THEREFOR

BACKGROUND OF THE INVENTION

1. Field of the Invention

The present invention relates to a display controller for a communication apparatus and its method, and, more particularly, to a display controller for a communication apparatus for displaying a received message, and its method.

2. Description of the Related Art

A conventional communication apparatus, for example, a pager with a display function, receives a message signal contained in a radio signal, and displays a received message on a display section. When one entire received message cannot be displayed on the display section at once, the message is first displayed in the maximum number of characters that can be displayed on the display section. Then, the message portions to be displayed are sequentially changed by the user for operating a scroll button or the like.

However, when the conventional pager with a display function receives a message with number of characters exceeding the number of characters which can be displayed on the display section at once, the user should operate the scroll button time and again. Therefore, when information is provided for a user by receiving and displaying a large amount of information, for example, data from a personal computer or the like, there is a problem that it is inconvenient and cumbersome for the user to view all information.

In addition, since the conventional pager with the display function displays all characters in double-width, more limitation than necessary is imposed on the number of characters displayed on the display section.

On the other hand, Japanese Patent Application Laid-Open No. 6-77881 discloses a radio selective calling receiver in which, display is performed by using characters with a size of 2N*2M dots if the number of characters of a received message exceeds a predetermined number, and by using characters with a size of N*M dots if the number of characters of the received message is equal to or larger than the predetermined number.

However, since the receiver in the laid-open application changes the size of character to be displayed depending on the number of received characters, it can use only characters the size of which can be changed.

SUMMARY OF THE INVENTION

An object of the present invention is to solve the above problems, and to provide an improved display controller for a communication apparatus and its method.

Another object of the present invention is to provide a display controller for a communication apparatus and its method, wherein the number of characters displayed on a display section can be increased to display more messages.

Still another object of the present invention is to provide a display controller for a communication apparatus and its method, wherein, when a message in the number of characters which is larger than that displayed on a display section at once is received, a part of the message is displayed in singe-width characters.

In addition, the present invention is intended to provide a display controller for a communication apparatus and its method, wherein it enables it to improve operability when one entire message is viewed.

Furthermore, the present invention is intended to provide a display controller for a communication apparatus and its method, wherein it enables it to change character size depending on the type of character in a message.

To attain the objects described above, the present invention is a display controller for a communication apparatus receiving signals containing a message and displaying the received message on a display section, the display controller comprising first storage means for storing the maximum number of characters in a message which can be displayed on the display section, determination means for comparing the number of characters in the received message with the maximum number of characters, and, if the number of characters in the received message is larger than the maximum number of characters, determining whether or not the received message contains characters of a predetermined specific type, converter means for converting the size of character of the predetermined specific type into a smaller size if characters of the specific type are contained on the basis of determination by the determination means, and control means for displaying the received message in at least two different sizes on the display section.

The control means is preferable to display characters of those constituting the received message which are of other than the predetermined specific type on the display section in the double-width size, and characters of the predetermined specific type in the single-width size.

In addition, it is preferable to further comprise second storage means for storing the received message in the at least two sizes.

Furthermore, the display controller is desirable to comprise second storage means for storing the received message in the same size, and operation means for instructing display of the message stored in the second storage means on the display section, wherein the determination means compares the number of characters in the stored message with the maximum number of characters, and, if the number of characters in the stored message is larger than the maximum number of characters, determines whether or not the stored message contains characters of a predetermined specific type, the converter means converting the size of character of the predetermined specific type into a smaller size if characters of the specific type are contained, the control means displaying the stored message in at least two different sizes on the display section.

Furthermore, the display controller for a communication apparatus according to the present invention comprises receiver means for receiving a message, display means for displaying the message received by the receiver means, and control means for compressing and displaying the received message on the display section if the amount of the received message is larger than a display capacity of the display means.

The control means is preferable to compress and display double-width characters in the received message into single-width characters.

Furthermore, a display control method for a communication apparatus according to the present invention is a display control method for a communication apparatus receiving signals containing a message and displaying the received message on a display section, the display control method comprising the steps of storing the maximum number of characters in a message which can be displayed on the display section; comparing the number of characters in the received message with the maximum number of characters; if the number of characters in the received message is larger than the maximum number of characters, determining whether or not the received message contains characters of a predetermined specific type; converting the size of character of the predetermined specific type into a smaller size if characters of the specific type are contained; and displaying the received message in at least two different sizes on the display section.

The displaying step is preferable to display characters of those constituting the received message which are of other than the predetermined specific type on the display section in the double-width size, and characters of the predetermined specific type in the single-width size.

BRIEF DESCRIPTION OF THE DRAWINGS

These and other objects, features and advantages of this invention will become more fully apparent from the following detailed description taken with the accompanying drawings in which:

FIG. 3 is a preferred example of character correspondence table applied to the present invention;

In the drawings, the same reference numerals denote the same structural elements.

DESCRIPTION OF THE PREFERRED EMBODIMENTS

Now, a preferred embodiment of the present invention is described in detail with reference to the drawings.

Figure 1:
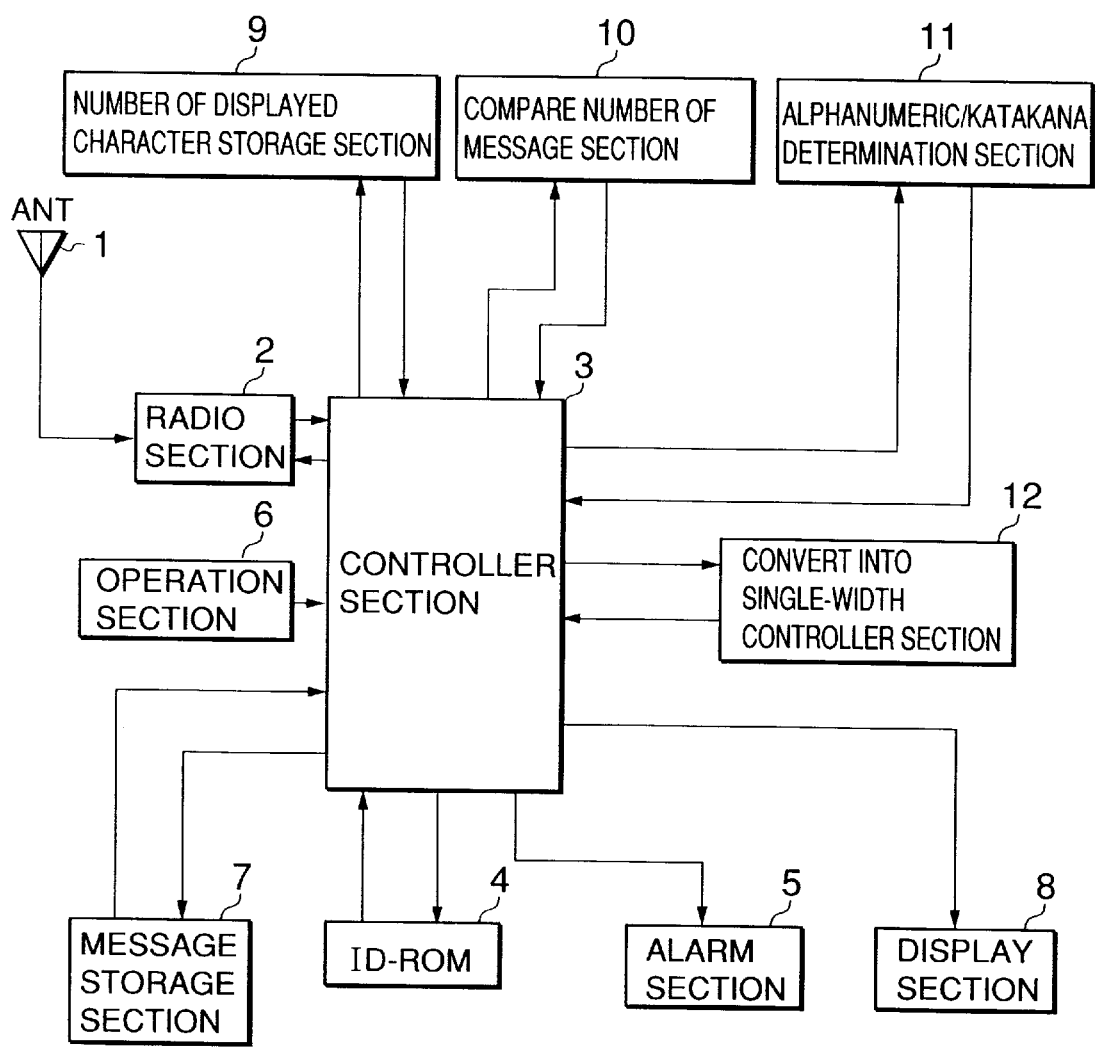
FIG. 1 is a block diagram of an arrangement of a preferred embodiment according to the present invention.

FIG. 1 is a block diagram of an arrangement of a communication apparatus showing a preferred embodiment according to the present invention. A communication apparatus of FIG. 1 particularly shows radio selective calling receiver.

However, the present invention is not limited to the radio selective calling receiver, but it is needless to say that the present invention may be applied to other radio communication apparatus such as a portable telephone set or PHS, and to a wire communication apparatus such as an ordinary indoor telephone set or cordless telephone set. In other words, the communication apparatus may be any type which has a relatively small display section, and displays a received message on the display section.

Referring to FIG. 1, in the radio selective calling receiver, an antenna 1 receives a radio frequency signal containing at least a selective calling number and a message signal following the selective calling number from the base station and the like, and supplies the received signal to a radio section 2. The radio section 2 demodulates the received signal, and outputs a demodulated signal to a controller section 3. The controller section 3 performs signal processing for the demodulated signal, and various controls which will be described later.

An ID-ROM 4 previously stores a unique selective calling number assigned to its receiver. The ID-ROM 4 may store a common selective calling number for receiving information such as stock prices in addition to the unique selective calling number.

The controller section 3 compares its selective calling number stored in the ID-ROM 4 with the received selective calling number. If comparison is matched, the controller section 3 performs signal processing of the message signal, and drives an alarm section 5. The alarm section 5 preferably consists of at least one of a vibrator, a speaker and an LED. As the alarm section 5 is driven, the user recognizes that a signal to him/her is received. Once the user performs an operation to stop the driving of the alarm section 5 with an operation section 6, the controller section 3 stops the driving of the alarm section 5. The operation section 6 has at least one button or switch. Preferably, it has a plurality of buttons, and has functions for instructing stopping of the alarm driving, displaying or scrolling of a message.

On the other hand, if the comparison is not matched, the controller section 3 does not perform processing of the message signal, and returns to a standby state.

A message storage section 7 stores the received message signal under control of the controller section 3. A display section 8 displays the received message signal under control of the controller section 3. The display may be performed at the same time the alarm section 5 is driven, or when a display operation is performed on the operation section 6. In addition, the display section 8 may display the message on its entire area, or may be divided into a plurality of areas which preferably includes a message display area, a date or date and time display area, a display area for various functions, and the like.

A number_of_displayed_character storage section 9 previously stores a display capacity which can be displayed at once on an area of the display section 8 on which a message can be displayed, or a message display area, preferably the maximum number of characters for a message. That is, it stores the maximum number of message which can be displayed on one screen. The maximum number of characters is the number when all characters being displayed are displayed in double-width size. The maximum number of characters may be previously set by an operator, but more preferably may be specified and changed by the user operating the operation section 6. Alternatively, it may be arranged to be rewritable from external equipment, so that, even if the size of display section is changed, it can be accommodated only by changing the number of characters stored in the number_of_displayed_character storage section 9.

A compare_number_of_message section 10 compares the number of characters in a received message with the maximum number of characters stored in the number_of_displayed_character storage section 9. Preferably, this comparison is performed when a message is received, or when a message is displayed. Result of comparison is output to the controller section 3. It is divided into a case where the number of characters in a received message is larger than the maximum number of characters, and a case where it does not. The controller section 3 receives a comparison result signal from the compare_number_of_message section 10 as an input, and, if the number of characters in the received message is within the maximum number of characters, displays all the characters in double-width size.

On the other hand, if the number of characters in the received message exceeds the maximum number of characters, an alphanumeric/katakana determination section 11 as specific character determination means determines whether or not the received message contains characters of a specific type. The character of specific type desirably includes alphanumeric, katakana, and alphabet. Those not included in the character of specific type include at least hiragana and Kanji.

If there are characters of the specific type, the controller section 3 converts the size of them into single-width with a convert_into_single-width controller section 12 as compression means, and displays them on the display section 8. If there is no characters of the specific type, the characters are displayed in double-width.

If the number of characters in the received message exceeds the stored maximum number of characters, and the received message contains characters which can be converted into single-width, the controller section 3 stores the received message on the message in the message storage section 7 in a state where characters in the specific type are converted into single-width. For characters which cannot be converted into single-width, and in a case where conversion into single-width is not required, the controller section 3 stores all characters in the message storage section 7 as characters of double-width. Therefore, there is no need to perform processing such as comparison of the number of characters when the stored message is displayed.

As described above, when a message cannot be displayed in one screen, it is displayed after the size of characters is compressed, more preferably into single-width.

Here, when the entire received message is stored in the message storage section 7 in double-width, the controller section 3 is preferable to perform processing operations such as change of character size as described above in displaying the stored message.

Figures 2A, 2B:
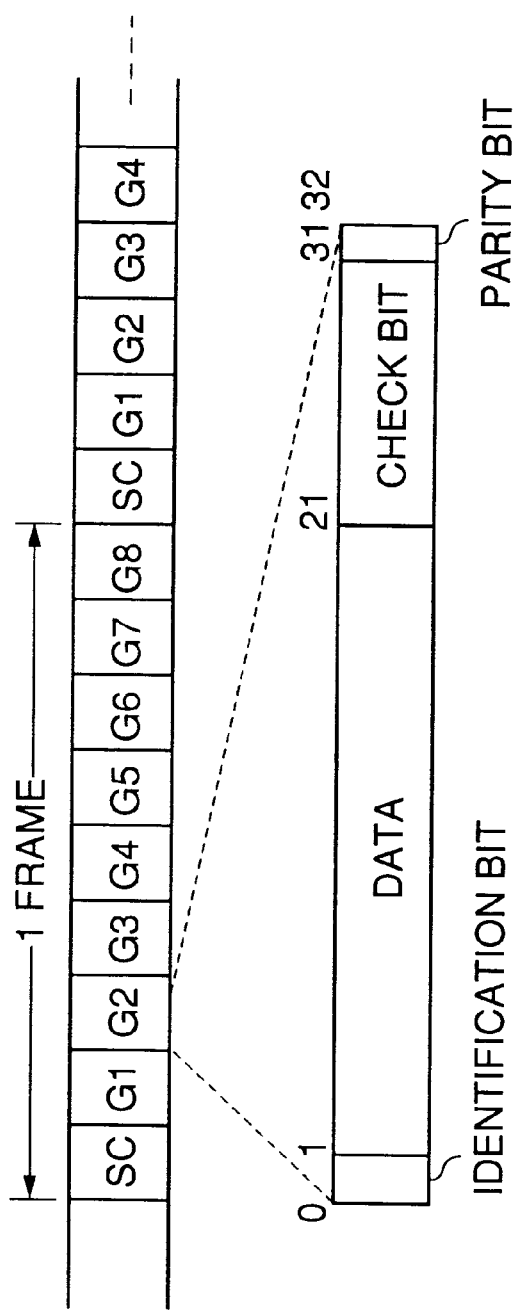
FIGS. 2(a) and 2(b) are signal formats of a preferred example of radio frequency signal applied to the present invention.

FIGS. 2a and 2b show a signal format of a preferred example of radio signal received by the antenna 1. Here, it shows a signal format in POCSAG.

The radio signal is composed of a plurality of frames as shown in FIG. 2(a), and each frame is composed of a synchronous signal SC and a plurality of groups G1 through G8. Each group is composed of two code words, and each code word is arranged as shown in FIG. 2(b), One code word consists of 32 bit, the first one bit being an identification bit, following 20 bits being data, further following ten bits being check bits, the last one bit being a parity bit.

The identification bit is to identify whether the following data is a selective calling number or a message signal. For example, the identification bit indicates that the following data is a selective calling number if it is "0", and that the following data is a message signal if it is "1".

FIG. 3 shows an example of code table indicating characters contained in the message signal. In FIG. 3, a character is represented by 8-bit codes b8 through b1. The most significant bit b8 indicates whether a character is hiragana or katakana. b8 indicates that a character is hiragana if it is "1", and that the character is katakana if it is "0". Lower seven bits b7 through b1 indicate a character or symbol. For example, if b8 through b1 is "00110001", "a" in katakana is displayed. Similarly, if they are "01110101", "JI" in Kanji is displayed.

In the table of FIG. 3, katakana can be displayed in single-width, which all other characters are displayed only in double-width.

Now, operation of the present invention is described in detail with reference to FIG. 4.

Figure 4:
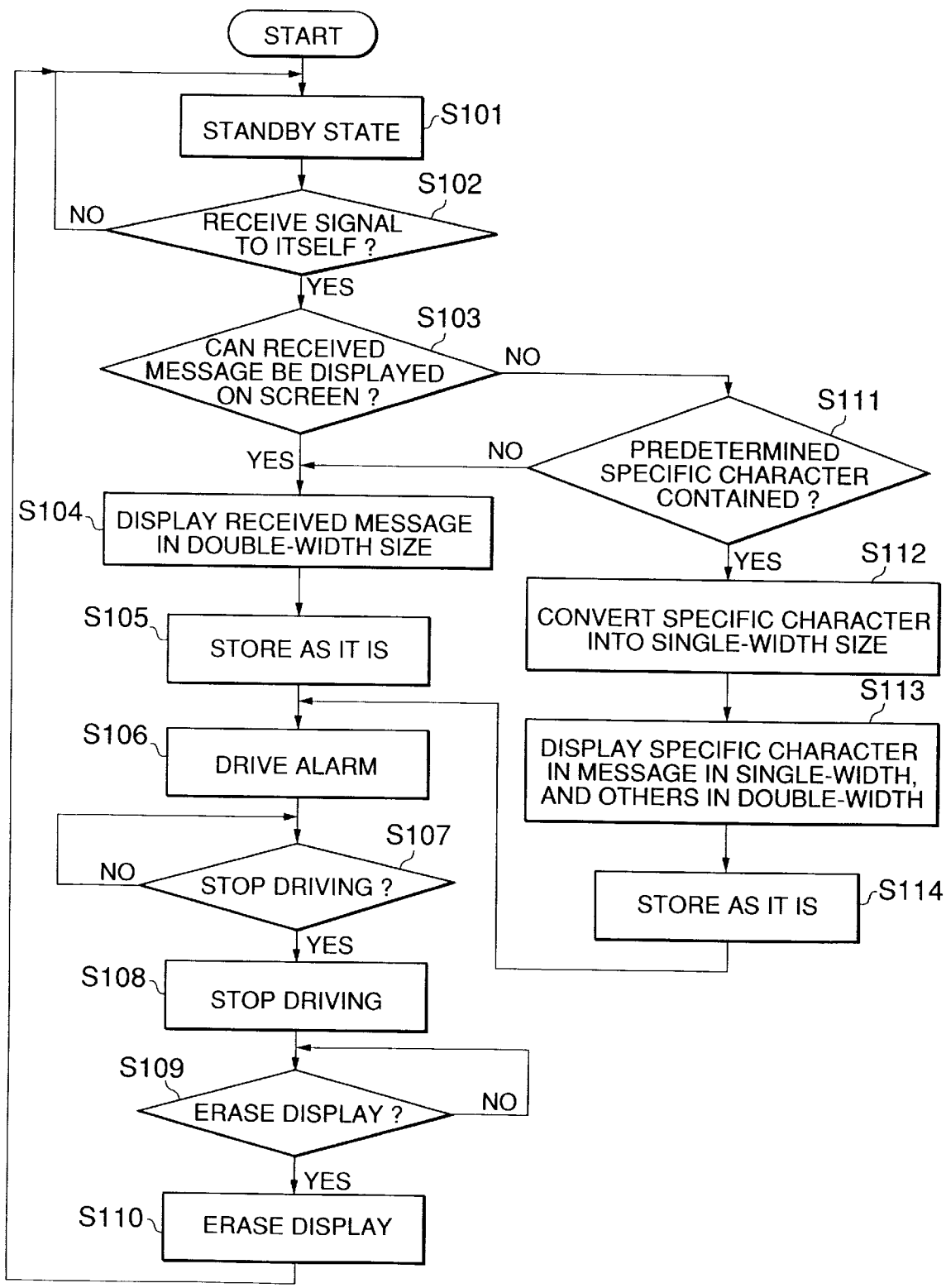
FIG. 4 is a flowchart for illustrating operation of a preferred embodiment according to the present invention.

In FIG. 4, when a power supply (not shown) for the receiver is turned on, the receiver is in a standby state (step S101). The standby state continues until it receives a radio frequency signal for it.

In the standby state, when a radio frequency signal for its receiver (step S102, YES) is received, the controller section 3 determines whether or not the entire received message can be displayed on the display section 8 at once (step S103). This determination is performed by first counting the number of characters in the received message with a counter (not shown) or the like, and comparing the counted number of characters with the maximum number of characters which can be displayed in the number_of_displayed_character storage section 9. A compare_number_of_message section 10 compares the counted number of characters with the stored maximum number of characters, and supplies the comparison result to the controller section 3. Here, the number of characters in the received message is preferably counted by the number of 8-bit codes.

The controller section 3 displays each character in double-width size on the display section 8 (step S104) if the number of characters in the received message is within the stored maximum number of characters (step S103, YES). In addition, the controller section 3 stores each character in the received message in the message storage section 7 in the double-width size (step S105). Furthermore, the controller section 3 drives the alarm section 5 (step S106). Here, these steps S104 through S106 may be conducted in any order.

When the user performs an operation to stop driving of the alarm through the operation section 6 (step S107, YES), the controller section 3 stops driving of the alarm (step S108). In addition, when the user performs an operation to stop display through the operation section 6 (step S109, YES), the controller section 3 stops display on the display section 8 (step S110).

On the other hand, if the process of step S103 indicates that the number of characters in the received message exceeds the stored maximum number of characters (step S103, NO), the controller section 3 determines whether or not the received message contains characters of a predetermined specific type (step S111). This determination is performed by the alphanumeric/katakana determination section 11. The alphanumeric/katakana determination section 11 stores an area of characters in the matrix shown in FIG. 3 which can be converted into those of single-width, preferably 8-bit codes, determines whether or not characters in the received message are those which can be converted into the single-width size, and supplies the result of comparison to the controller section 3. If the comparison result does not indicate existence of characters which can be converted into the single-width size (step S111, NO), the controller section 3 proceeds to the process of step S104 where the operation of step S104 and later described above is performed.

If the comparison result indicates that the received message contains characters which can be converted into the single-width size (step S111, YES), the controller section 3 converts the convertible characters into single-width characters in the convert_into_single-width controller section 12 (step S112). Subsequently, the controller section 3 displays the message containing characters of both sizes of the character converted into the single-width size and the characters in the double-width size on the display section 8 (step S113), and stored them in the combined state in the message storage section 7 (step S114).

Since the subsequent process is the same as the process following step S106 described above, its description is omitted to avoid redundancy.

Although the operation shown in FIG. 4 performs storing into the message storage section 7 in a combined state, that is, in a state where characters converted into the single-width size and characters in the double-width size are contained, it may be possible to store all characters in the double-width size in the message storage section 7. In this case, when a stored message is displayed on the display section 8, it is necessary to perform comparison on the length of stored message, and determination on specific characters.

The operation in such a case is described with reference to an operation flowchart of FIG. 5.

Figure 5:
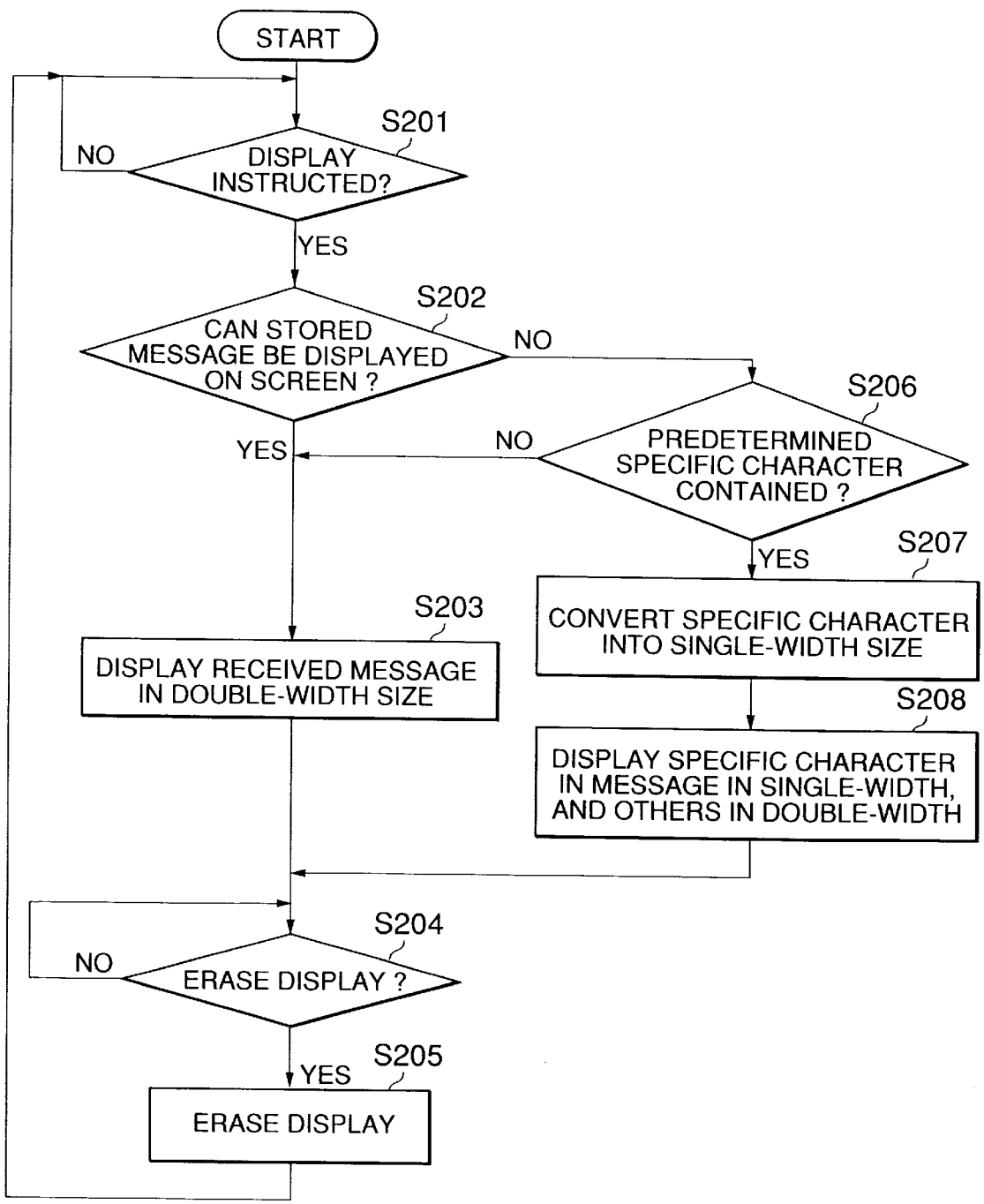
FIG. 5 is a flowchart for illustrating operation of another preferred embodiment according to the present invention.

When, in FIG. 5, an operation on the operation section 6 instructs to display a message stored in the message storage section 7 (step S201), the instructed message is determined whether or not it can be displayed on one screen (step S202). If it can be displayed on one screen, all characters in the instructed message are displayed in the double-width size (step S203). Subsequently when the operation section 6 instructs to stop display (S204, YES), the controller section 3 stops display on the display section 8 (step S205).

On the other hand, if the process of step S202 indicates that the instructed message cannot be displayed on one screen, it is determined whether or not predetermined specific characters are contained (step S206). If the specific character is not contained, the processing proceeds to the process of step S203, while, if it is contained, the specific character is converted into the single-width size (step S207). Then, the specific character is converted into the single-width size, and other characters are displayed in the double-width size (step S208).

Although, in the above-described embodiment, the specific characters are alphanumeric, katakana or the like, they may be any characters which are used in various national languages, and can be converted into the single-width size.

As described above, since the present invention detects alphanumeric or katakana characters when a message containing alphanumeric or katakana characters and exceeding one screen is received, and can display the alphanumeric or katakana characters, there is provided an advantage that the number of characters which can be displayed on one screen can be increased, and as many messages as possible can be displayed on one screen.

In addition, since the present invention can attain to increase the number of characters which can be displayed on one screen, there is provided an advantage that the number of screen in displaying the entire received message can also be reduced.

Furthermore, since the present invention can attain to decrease the number of screens in displaying a message, and the process of changing over screen can be also reduced, there is provided an advantage that life of battery can be improved as consumption current is reduced.

Still further, the present invention can change the size of character only by processing in the receiver without causing to include a signal specifying the size of character in a radio frequency signal.

Furthermore, since the present invention stores the number of characters which can be displayed on one screen in the double-width size, and converts only characters which can be displayed in the single-width size into the single-width display if a received message contains the number of characters exceeding the number which can be displayed on one screen, it is possible to increase the number of characters which can be displayed on one screen, and decrease the number of display screens. Thus, there is advantages that the number of changing over screens in confirming a message can be reduced, that consumption current can be reduced due to reduction of screen change-over process, thereby life of a battery being improved.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A display controller for a communication apparatus, said communication apparatus receiving a message having received characters, and displaying the received characters on a display section, said display controller comprising:

a first storage for storing the maximum number of characters which can be displayed on one screen of the display section when the characters are displayed in a first size;

a determination section for comparing the number of received characters with the maximum number of characters stored in said first storage, and, if the number of received characters is larger than the maximum number of characters, determining whether or not the received message contains at least one specific character which can be displayed on the display section in a second size which is smaller than the first size;

a converter for converting the size of the at least one specific character into the second size from the first size if the at least one specific character is contained in the received message; and a controller for displaying the received characters in the first and second sizes on the one screen of the display section, wherein the at least one specific character is displayed in the second size and the other received characters are displayed in the first size.

2. The display controller as set forth in claim 1, wherein the first size is equal to a double-width size, and the second size is equal to a single-width size.

3. The display controller as set forth in claim 1, further comprising a second storage for storing the received characters contained in the received message in at least the first size and the second size.

4. A display controller for a communication apparatus comprising:

a receiver for receiving a message having a first character and a second character;

a display for displaying the message received by said receiver; and a controller for displaying the message on one screen of said display in which the first character is displayed in a first size and the second character is displayed in a second size which is smaller than the first size, if an amount of the message is larger than a display capacity on the one screen.

5. The display controller as set forth in claim 4, wherein the first size corresponds to a double-width size and the second size corresponds to a single-width size.

6. A display control method for a communication apparatus receiving signals containing a message and displaying the received message on a display section, said display control method comprising:

storing the maximum number of characters which can be displayed on one screen of the display section when the characters are displayed in a first size;

comparing the number of received characters in the received message with the maximum number of characters;

if the number of the received characters is larger than the maximum number of characters, determining whether or not the received message contains at least one specific character;

converting a size of the at least one specific character into a second size which is smaller than the first size if the at least one specific character is contained; and displaying the received message in at least two different sizes on the one screen of the display section, wherein the at least one specific character is displayed in the second size and the other characters contained in the received message are displayed in the first size.

7. The display control method as set forth in claim 6, wherein the first size corresponds to a double-width size, and the second size corresponds to a single-width size.

8. The display control method as set forth in claim 6, further comprising storing the received message in at least two sizes including the first and second sizes.

9. The display controller as set forth in claim 1, wherein said converter does not convert the size of the at least one specific character when the number of the received characters is not larger than the maximum number of the characters even if the at least one specific character is contained in the received message, whereby said controller displays the at least one specific character in the first size.

10. The display controller as set forth in claim 1, wherein the specific character is an alphanumeric character.

11. The display controller as set forth in claim 1, further comprising:

a message storage for storing the received characters including the at least one specific character in the first size before said converter converts the size of the at least one specific character.

12. The display controller as set forth in claim 4, wherein said controller displays the first and second characters in the first size when the amount of the message is not larger than the display capacity on the one screen.

13. The display controller as set forth in claim 4, wherein the second character is an alphanumeric character.

14. The display controller as set forth in claim 4, comprising:

a converter for converting the size of the second character when the amount of the message is not larger than the display capacity of the one screen.

15. The display controller as set forth in claim 14, further comprising:

a message storage for storing the first and second characters in the first size before said converter converts the size of the second character into the second size from the first size.

16. The display control method as set forth in claim 6, wherein converting the size of the at least one specific character is not preformed when the number of the received characters is not larger than the maximum number of the characters even if the at least one specific character is contained in the received message, whereby displaying the at least one specific character in the first size.

17. The display control method as set forth in claim 6, further comprising:

storing the received characters including the at least one specific character in the first size before the size of the at least one specific character is converted into the second size from the first size.

18. The display control method as set forth in claim 6, further comprising:

displaying the received characters including the at least one specific character in the first size when the number of the received characters is not larger than the maximum number of the characters even if the at least one specific character is contained in the received message.

* * * * *